Dec. 2, 1924.
G. F. BELL
TRACTION INCREASING DEVICE
Filed June 17, 1924
1,517,939
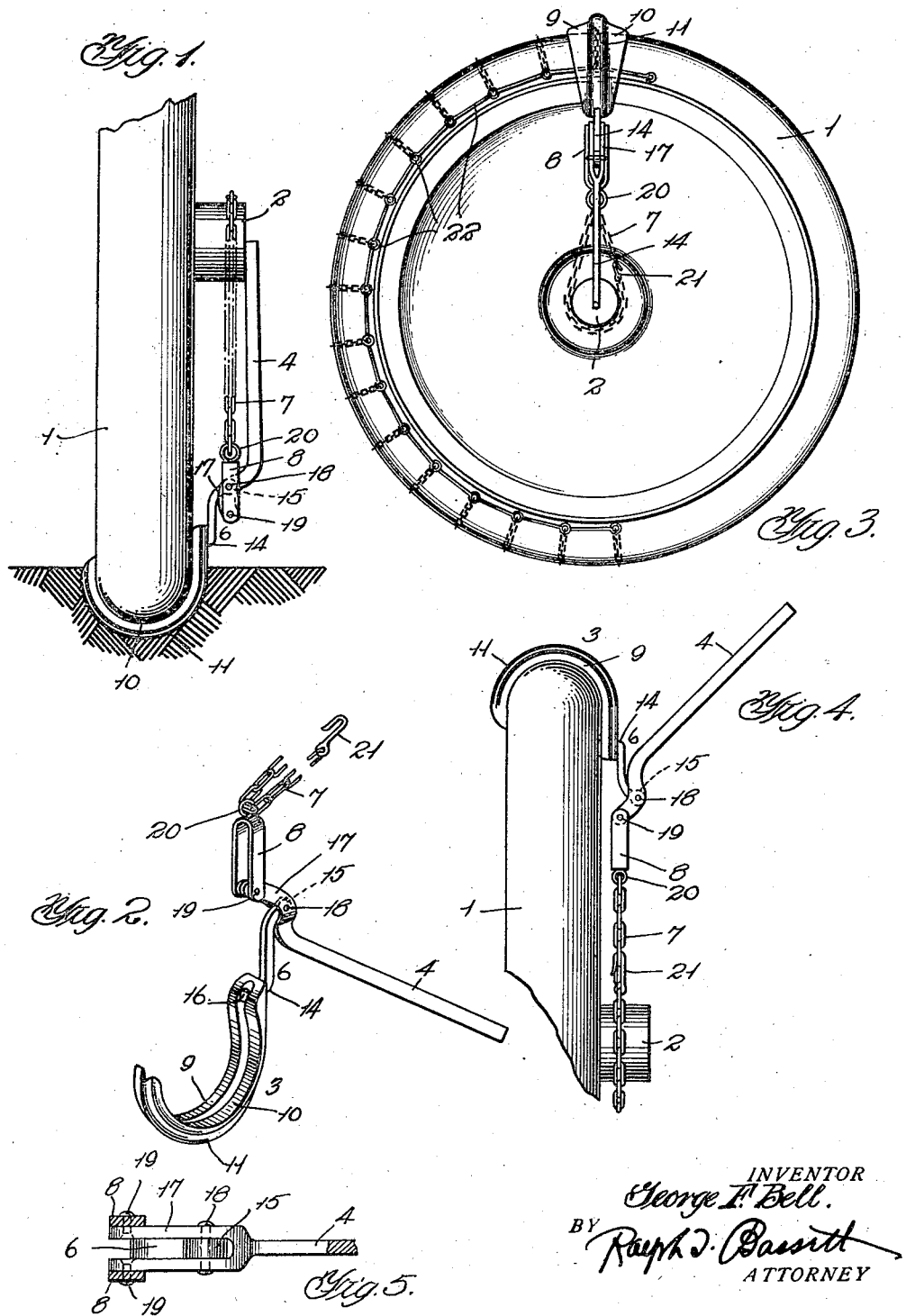
INVENTOR
George F. Bell.
BY Ralph J. Bassett
ATTORNEY Patented Dec. 2, 1924.

1,517,939

UNITED STATES PATENT OFFICE.

GEORGE FRANCIS BELL, OF TULSA, OKLAHOMA.

TRACTION-INCREASING DEVICE.

Application filed June 17, 1924. Serial No. 720,596.

*To all whom it may concern:*

Be it known that I, GEORGE F. BELL, a citizen of the United States, residing at Tulsa, in the county of Tulsa and State of Oklahoma, have invented certain new and useful Improvements in Traction-Increasing Devices, of which the following is a specification.

This invention relates more particularly to traction increasing means for the wheels of motor vehicles.

The object of this invention is to provide a traction increaser capable of application or removal to or from all types of wheels, either spoke, disc or the like, regardless of their diameter, and which may be utilized by itself or in conjunction with the conventional anti-skid chain.

More particularly the present invention includes a mud-hook, means for connecting same to a hub and a lever with eccentric link connections for exerting the necessary pull between the hook and the connecting means for seating the former in its proper position on a tire and locking same in such seated position.

Other features and advantages will more clearly hereinafter appear by reference to the accompanying drawings forming a part of this specification and wherein like numerals of reference designate corresponding parts throughout the several views in which:

Fig. 1 is an end elevation showing in part a wheel with the present invention in position.

Fig. 2 is a perspective view showing the operating means in open position.

Fig. 3 is a side elevation of a wheel showing the present invention in position in connection with the application of an anti-skid chain.

Fig. 4 is an end elevation of a portion of a wheel showing the present invention with the operating lever in raised position, and Fig. 5 is an enlarged detail of the link construction.

Referring now to the specific construction, a conventional wheel is shown such as may be utilized on any form of motor vehicle, this wheel may be of any size or type, disc, spoke or the like, and should be one of the power wheels, in a majority of instances, the rear wheels. The tire or shoe is indicated by reference numeral 1 and the hub at 2. Referring more particularly to Figure 2, the device will be seen to comprise the semi-cylindrical mud hook 3, operating arm 4, connecting link 6, chain 7, and connecting link 8 between the extremity of the operating arm 4 and the chain 7.

The hook 3 in cross section comprises lateral supporting portions 9 and 10 and intermediate arched portion 11 the entire body being integral in construction and the inner faces of the supporting portions 9 and 10 being substantially flat to conform to the contacting outer face of a tire or the like portion when in position. The cross-section of the hook is substantially identical throughout except at its outer end where its structure is substantially increased in thickness and is turned outward slightly to permit the connection with the link 6 without contacting with the adjacent face of the tire. These hooks are made of varying size and may be interchangeable to fit the different size tires.

This link 6 includes the intermediate body portion and oppositely extending lateral extremities 14 and 15. The extremity 14 extends through a perforation formed in the arched portion of the enlarged outer end of the hook and is headed as at 16, this head being of such size as to reside wholly within the arm 11 and thus avoid contact with the face of the tire, the link 6 being thereby swiveled in the end of the hook.

The operating lever 4 includes the laterally off-set extremity 17 which is bifurcated and between the bifurcated walls of the off-set portion at a point adjacent the body the opposite end of the link 6 is pivoted by means of the transverse pin 18. The U-shaped link 8 straddles the bifurcated extremities of the off-set portion of the operating handle 4 and the free ends of this link are individually pivoted to the free ends of the handle 4 by means of pins or rivets 19. By this arrangement the space between the bifurcated ends of the handle 4 permits the movement of the adjacent parts during the manipulation of the device.

A ring 20 is swiveled to extend outwardly from the intermediate portion of the U-shaped link 8 and the chain 7 passes therethrough for connection to the hub of a wheel as will hereinafter more clearly appear. This chain 7 is provided at one end with a hook 21 suitable in construction for engagement with the chain throughout its length to permit adjustment during application to various diameter wheels.

In Figure 3 I have shown the use of the present invention in connection with the conventional anti-skid chain. A chain of this character is indicated by reference character 22 and it will be noted that the first cross chain is located within the groove formed by the arched portion 11 of the hook 3. This hook 3 will securely hold one end of the chain and the wheel can then be rotated by forward movement of the vehicle to cause the positioning of the chain proper, after which the terminal hooks can be snapped into engagement with the adjacent link of the opposite terminals of the longitudinal stands.

The use and application of the present invention is as follows: When it is found that the condition of a roadway is such that the tractive surface of the rear tires to which the power is applied is not sufficient to cause the propulsion of the vehicle, one, or if necessary several, of the tractive devices heretofore described may be positioned by first locating the cast hook portion over the top of the tire and with the handle in raised position looping the chain around the hub as firmly as possible. The lever is then moved downwardly which will cause the hook to be forced firmly against the tire. If it is found that the use of the hooks forming the subject matter of the present invention are not sufficient to provide the necessary tractive force, a chain may then be applied without the use of a jack or other elevating means. This is accomplished by arranging the first cross chain of the usual anti-skid chain under the channel or groove formed by the arched intermediate portion of the hook and clamping same in place. The forward movement of the vehicle will then cause the chain to wrap itself around the wheel in the usual manner and the same can then be fastened at its terminals.

From the foregoing it will be seen to one skilled in the art that a device has been provided which in itself is capable of considerably increasing the traction of a wheel and of which several may be utilized on one wheel. In addition to this, the present invention is capable of use in connection with the usual anti-skid chain and when so used acts as an anchoring member to retain one end of the chain in position to permit the rotation of the wheel and consequent positioning of the remainder of the chain. This arrangement eliminates the jacking of the machine which at times is not only disagreeable but practically impossible due to the condition of the roadway.

In addition to the foregoing, the novel construction of the operating mechanism as well as the hook element permits the application of the device either with or without the use of anti-skid chains on any type or size of wheel, which is impossible with devices with which applicant is familiar. It is obvious that due to the fact that the only anchoring element for the present invention is secured to the projecting hub which is necessarily present on wheels of all varieties, application is possible in every instance without extraneous fastening means.

Changes in the details of construction and arrangement of parts may be made without departing from the spirit of the invention as set forth in the annexed claims.

What I claim as new and desire to secure by Letters Patent, is:

1. A device of the class described comprising a traction element formed with an internal groove for receiving a cross chain of an anti-skid chain, and means for securing said traction element to a wheel.

2. In combination, a traction element formed with an internal groove for receiving a cross chain of an anti-skid chain, means for securing said traction element to the projecting hub portion of a wheel, and means for adjusting said traction element with relation to said fastening means.

3. A mud hook comprising a curved traction element, a link swiveled to said hook, an operating lever, said link being pivoted to said lever at a point spaced from the end of said lever, a link connected to the end of said lever, and a chain carried by said last mentioned link.

4. A mud-hook comprising a curved traction element, a link swiveled at one end to said element, an operating lever having an off-set portion, said link being pivoted at its opposite end to the off-set portion of said lever at a point adjacent the body portion, a U-shaped link pivoted to the extremity of said off-set portion, and a chain carried by said last mentioned link.

5. A mud-hook comprising a curved traction element, a link swiveled at one end to said element, an operating lever having a bifurcated off-set portion, said link being pivoted at its opposite end between the bifurcated ends of said lever at a point adjacent the handle, a U-shaped link having its ends pivoted individually to the bifurcated ends of said off-set portion, a ring swiveled to the intermediate portion of said U-shaped link, and a chain extending through said ring.

In testimony whereof I affix my signature.

GEORGE FRANCIS BELL.